(12) United States Patent
Mafrici et al.

(10) Patent No.: US 9,016,044 B2
(45) Date of Patent: Apr. 28, 2015

(54) IC ENGINE AND METHOD FOR OPERATING AN IC ENGINE

(75) Inventors: Giovanni Mafrici, Turin (IT); Lorenzo Magro, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 978 days.

(21) Appl. No.: 12/968,117

(22) Filed: Dec. 14, 2010

(65) Prior Publication Data

US 2011/0138784 A1    Jun. 16, 2011

(30) Foreign Application Priority Data

Dec. 14, 2009   (GB) .................................. 0921772.0

(51) Int. Cl.
| | | |
|---|---|---|
| F02M 25/06 | (2006.01) | |
| F01N 3/00 | (2006.01) | |
| F01N 5/00 | (2006.01) | |
| F02M 25/07 | (2006.01) | |

(52) U.S. Cl.
CPC ....... F02M 25/0743 (2013.01); F02M 25/0723 (2013.01); F02M 25/0751 (2013.01); Y02T 10/121 (2013.01)

(58) Field of Classification Search
CPC .......... F02M 25/0723; F02M 25/0743; F02M 25/0751; Y02T 10/121
USPC .................................... 60/274, 278, 284, 285
See application file for complete search history.

(56) References Cited

U.S. PATENT DOCUMENTS

| | | | |
|---|---|---|---|
| 5,653,202 A | | 8/1997 | Ma |
| 6,138,649 A | * | 10/2000 | Khair et al. .............. 123/568.12 |
| 6,167,865 B1 | | 1/2001 | Ma |
| 6,212,881 B1 | * | 4/2001 | Takahashi et al. .............. 60/274 |
| 6,901,743 B2 | | 6/2005 | Asanuma et al. |
| 2003/0154716 A1 | | 8/2003 | Redon |
| 2003/0233825 A1 | | 12/2003 | Asanuma et al. |
| 2006/0288694 A1 | | 12/2006 | Hayashi |

FOREIGN PATENT DOCUMENTS

| | | | |
|---|---|---|---|
| DE | 4025565 | * | 2/1992 |
| DE | 4025565 A1 | | 2/1992 |
| DE | 19717846 A1 | | 11/1998 |
| DE | 10306015 A1 | | 11/2003 |
| DE | 69815543 T2 | | 1/2004 |
| DE | 102006029518 A1 | | 2/2007 |
| DE | 60307367 T2 | | 8/2007 |
| EP | 0956444 A1 | | 11/1999 |
| GB | 153842 A | | 11/1920 |
| GB | 2386645 A | | 9/2003 |
| WO | 9522687 A1 | | 8/1995 |
| WO | 2008138535 A2 | | 11/2008 |
| WO | 2009036992 A1 | | 3/2009 |

OTHER PUBLICATIONS

British Patent Office, Search Report for British Application No. GB0921772.0, dated Mar. 16, 2010.

* cited by examiner

*Primary Examiner* — Jason Shanske
*Assistant Examiner* — Diem Tran
(74) *Attorney, Agent, or Firm* — Ingrassia Fisher & Lorenz PC

(57) ABSTRACT

A method is provided for operating an internal combustion engine of a motor vehicle. The method includes, but is not limited to storing exhaust gas while the engine is working, and supplying the stored exhaust gas into at least an engine cylinder during a subsequent start phase of the engine.

9 Claims, 3 Drawing Sheets

IC ENGINE AND METHOD FOR OPERATING AN IC ENGINE

CROSS-REFERENCE TO RELATED APPLICATION

This application claims priority to British Patent Application No. 0921772.0, filed Dec. 14, 2009, which is incorporated herein by reference in its entirety.

TECHNICAL FIELD

The technical field relates to an internal combustion (IC) engine of a vehicle, in particular to an IC engine provided with an exhaust gas recirculation (EGR) system.

BACKGROUND

An internal combustion engine generally comprises a plurality of cylinders, each having at least one intake valve and at least one exhaust valve. The intake valves are fluidly connected with an intake system for feeding ambient air into the cylinders, and the exhaust valves are fluidly connected with an exhaust system for discharging exhaust gas from the cylinders to the environment. The intake system generally comprises an intake manifold connected to the ambient air, and a plurality of intake conduits that lead from the intake manifold to each intake valve.

In order to reduce polluting emission, most internal combustion engines are provided with an EGR system, which is arranged for routing back exhaust gas from the exhaust system to the intake system. One of the main benefits of the EGR system is the reduction of $NO_x$ emission. However, it has been experimentally found that, during the start phase of an IC engine with EGR, namely during the first combustion cycles after the engine start, the amount of $NO_x$ emitted in the environment is higher than expected. This $NO_x$ peak is due to several adverse conditions that are typical of the start phase of the engine.

A first adverse condition is that the EGR circuit is substantially empty, since the IC engine has been inactive for a certain stop time without thereby producing exhaust gas. Another adverse condition is that the internal combustion engine takes several combustion cycles before filling the EGR circuit with exhaust gas. A further adverse condition is that the EGR valve is quite far from the engine cylinders, so that the exhaust gas reaches the latter with a certain delay. Another adverse condition is that, when the internal combustion engine is off, the intake manifold contains a lot of oxygen ($O_2$) that, in combination with the late EGR recirculation, increases the production of $NO_x$.

The above mentioned drawback is particularly important with regard to the vehicles in which a start and stop (S&S) functionality is implemented in the Engine Control Unit (ECU). The S&S functionality provides for the ECU to automatically shut off the engine when the vehicle speed is zero, avoiding in this way the fuel consumption during idle condition, that is the worst efficient engine operating condition, and to automatically restarting the engine when the vehicle is commanded to move, namely in response of the crank-in after a stop time. Because of the many start phases, an IC engine with EGR and S&S functionality may globally emit more NO than an IC engine with EGR but without S&S functionality, and eventually exceed the limit set by the strictest antipollution standards. Experimental data confirm that, in an IC engine with EGR, the S&S functionality causes about 5% NOx increase along the New European Driving Cycle (NEDC).

In view of the foregoing at least one object is to solve, or at least to positively reduce, the above mentioned drawback with a simple, rational and cheap solution. In addition, other objects, desirable features and characteristics will become apparent from the subsequent summary and detailed description, and the appended claims, taken in conjunction with the accompanying drawings and this background.

SUMMARY

An embodiment provides a method for operating an internal combustion engine of a motor vehicle. The method comprises the steps of storing exhaust gas during the operation of the engine, and supplying the stored exhaust gas into at least one engine cylinder during a subsequent start phase of the engine. In this way, an adequate amount of exhaust gas is kept stored when the engine is off and is fed into the cylinder during the first combustion cycles after the engine start, to thereby effectively avoiding the NO emission peak.

According to an embodiment, the method provides for regulating one or more engine operating parameters, in order to increase exhaust gas production during the storage phase of the exhaust gas. Because of the exhaust gas production increase, the pressure within the exhaust system of the engine proportionally rises, allowing the storage of high pressured exhaust gas.

According to another embodiment, the method provides for storing the exhaust gas during at least a shut off phase of the engine, namely during the last combustion cycles before the engine stop.

Another embodiment provides an IC engine for a motor vehicle, which is designed for carrying out the preceding embodiments. The engine is provided with an EGR system comprising a tank and a valve or valving means configured for storing exhaust gas into said tank during the operation of the engine, and for supplying exhaust from said tank to at least an engine cylinder during a start phase of the engine.

While the engine is working, the exhaust gas flows from the EGR system into the tank, until the internal pressure of the tank equals the maximum pressure peak within the EGR system. While the engine is off, the stored exhaust gas is kept pressurized within the tank. During the subsequent engine start phase, the pressurized exhaust gas is supplied from the tank into the cylinder.

According to an embodiment, the tank is fluidly connected to at least an intake conduit per cylinder via a respective injection port. If the engine is provided with a swirl system, said at least an intake conduit is that provided with a swirl valve. In this way, it is possible to achieve a high delta pressure between the tank and the intake conduit. Because of this high delta pressure, the tank can be empty quite completely during the start phase of the engine, so that it is possible to use a rather small tank, limiting the cost and the overall dimensions. Nevertheless, the tank can eventually comprise an injection port per each cylinder intake conduit.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
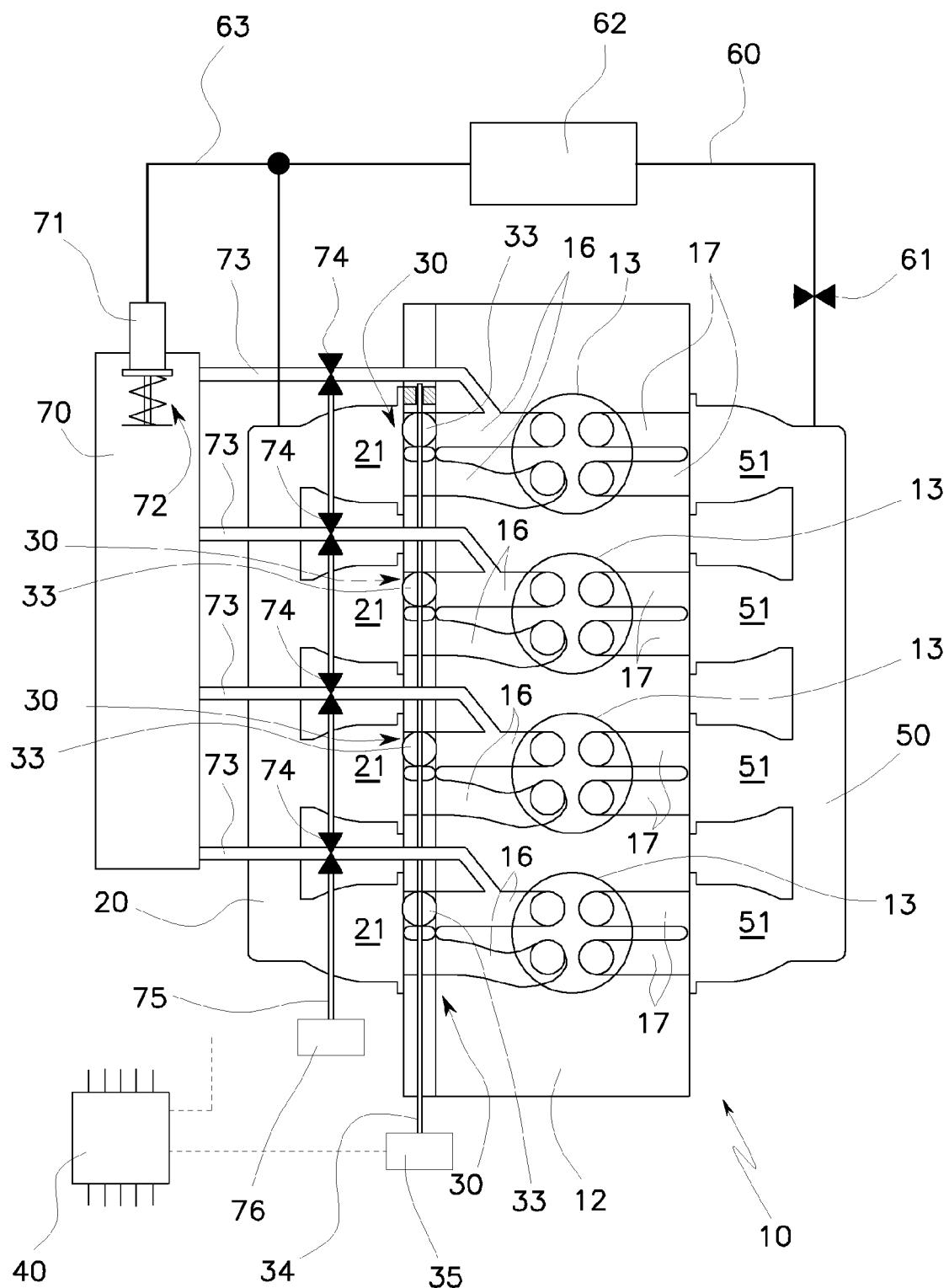
FIG. 1 is a schematic illustration of an internal combustion system of a vehicle.

FIG. 1 schematically illustrates an internal combustion (IC) engine 10 of a vehicle. The IC engine 10 can be a spark ignition engine as well as a Diesel engine. The IC engine 10 comprises a cylinder bank 12 having a plurality of cylinders 13.

Figure 2:
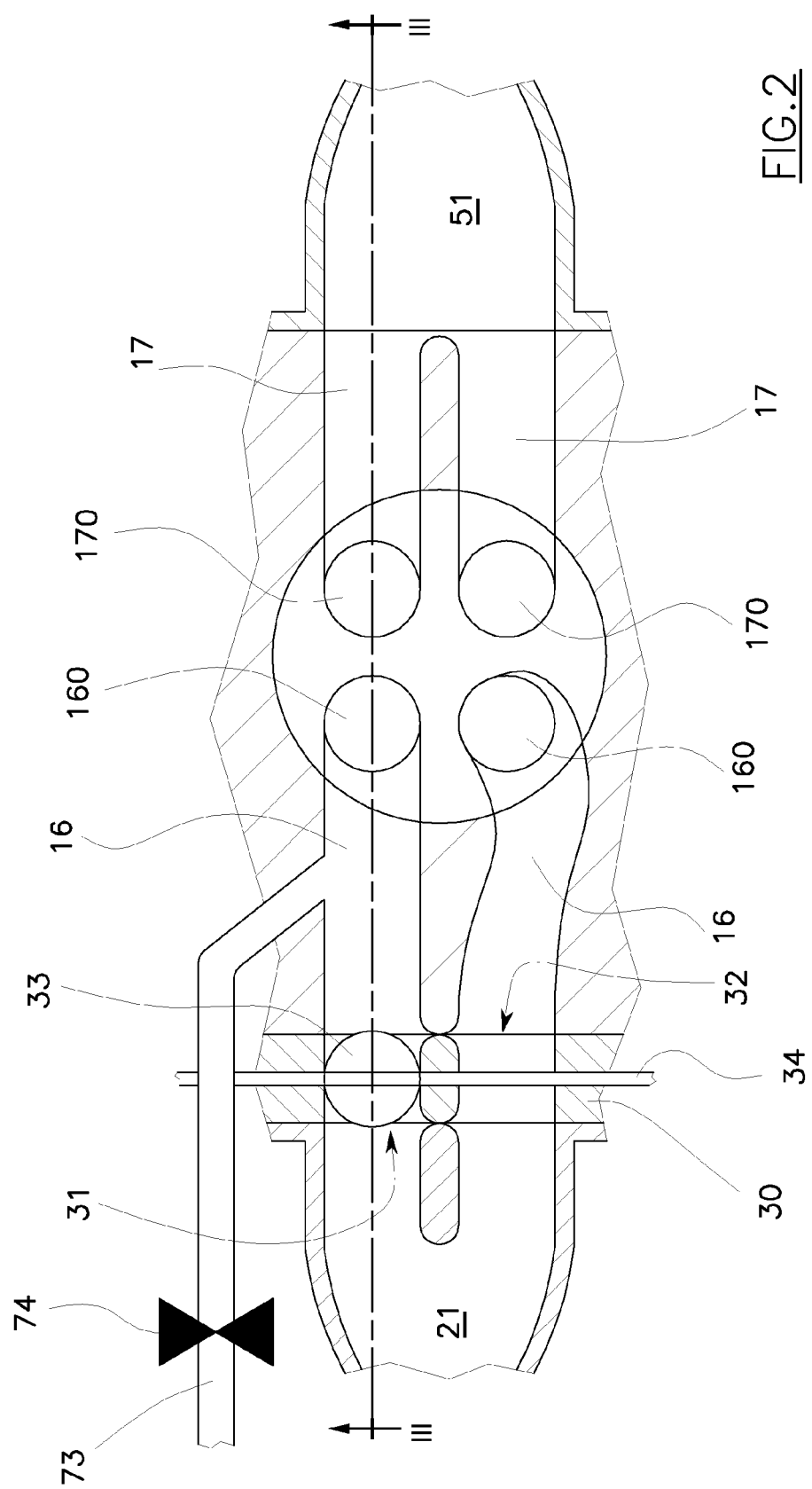
FIG. 2 is a magnified detail of FIG. 1.
Figure 3:
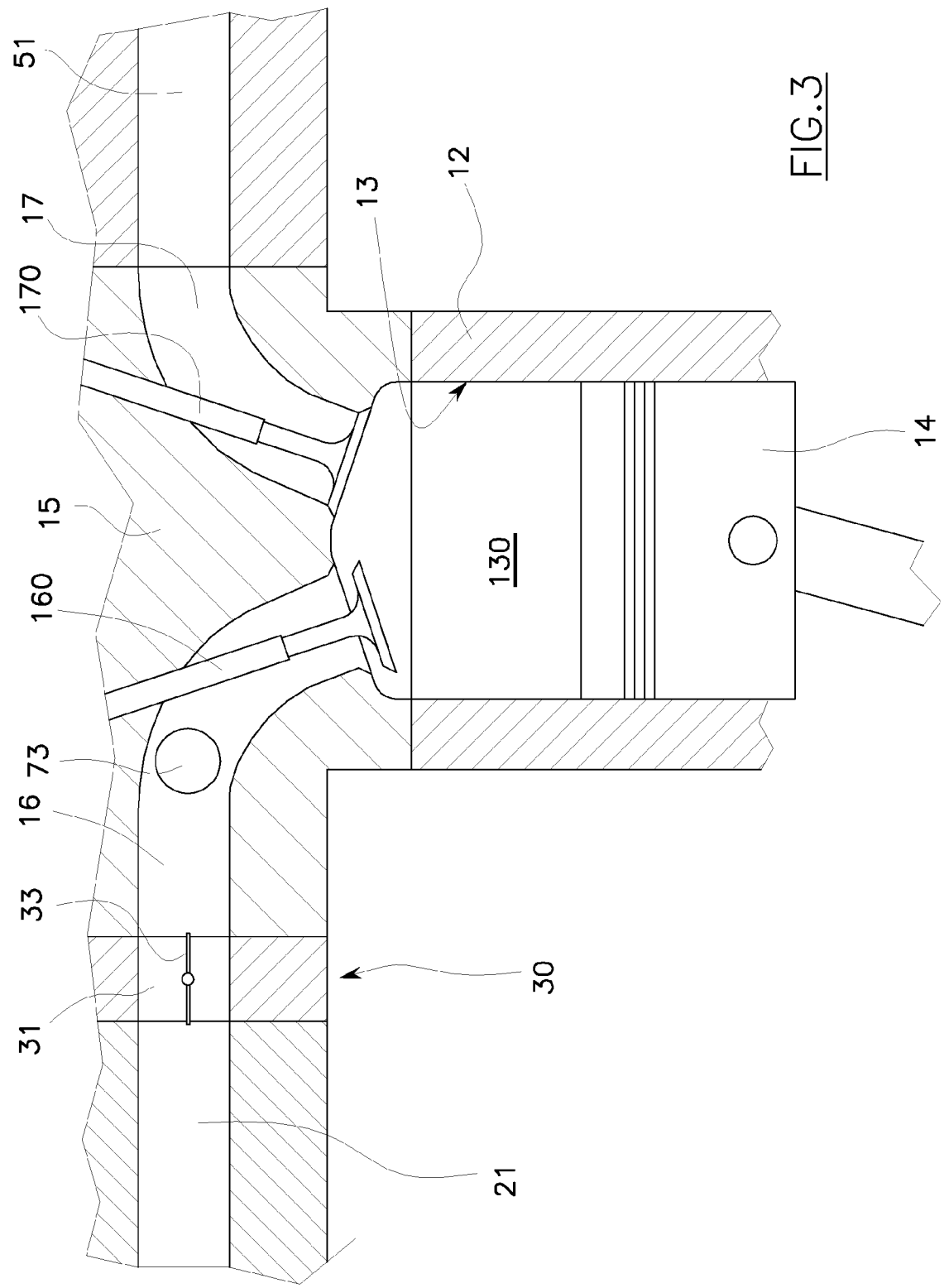
FIG. 3 is the section III-III indicated in FIG. 2.

As shown in FIG. 3, each cylinder 13 is closed on the bottom by a respective reciprocating piston 14, and is closed on the top by a cylinder head 15, which defines a combustion chamber 130 above the piston 14. Each cylinder 13 is provided with a plurality of intake ports 16 realized in the cylinder head 15 (see also FIG. 2), each of which leads in the combustion chamber 130 through a respective intake valve 160. Each cylinder 13 is further provided with a plurality of exhaust ports 17 realized in the cylinder head 15 (see also FIG. 2), each of which leads from the combustion chamber 130 through a respective exhaust valve 170. The intake and exhaust valves 160,170 are opened and closed by means of a well known driving apparatus. It should be appreciated that the number of cylinders 13, as well as the number of intake ports 16 and the number of exhaust ports 17, are not intended to limit the scope of the present invention, it being understood that the IC engine 10 should generally have at least one cylinder 13, at least one intake port 16 per cylinder and at least one exhaust port 17 per cylinder.

The IC engine 10 is provided with an intake manifold 20 that is fluidly connected with the ambient air through conventional means (not shown). The intake manifold 20 comprises a plurality of branches 21, each of which is fixed to the cylinder head 15, and is provided for fluidly connecting the intake manifold 20 to all the intake ports 16 of a respective cylinder 13.

In greater detail, a swirl device 30 is held between each branch 21 and the cylinder head 15. As shown in FIG. 2, the swirl device 30 comprises a valve body having two separate passages 31 and 32, which respectively connect the branch 21 with each intake ports 16 of the respective cylinder 13, and a swirl valve 33 that is arranged for rotating into the passage 31, in order to regulate the turbulence within the cylinder 13.

As shown in FIG. 1, all swirl valves 33 are fixed to a common rotating shaft 34, which is driven by an electromechanical actuator 35, for simultaneously rotating the swirl valves 33 within the respective passages 31. The electromechanical actuator 35 is controlled by an engine control unit (ECU) 40 on the base of a plurality of engine operating parameters. As a matter of fact, each intake valve 160 is fluidly connected with the intake manifold 20 through a respective intake conduit, which globally comprises the intake port 16, the passage 31 or 32, and the branch 21.

The IC engine 10 is further provided with an exhaust manifold 50 that is fluidly connected with the environment through conventional means (not shown), for discharging the exhaust gas produced by the combustion within the engine cylinder 13. The exhaust manifold 50 comprises a plurality of branches 51, each of which is fixed to the cylinder head 15, and is provided for fluidly connecting the exhaust manifold 50 to both the exhaust ports 17 of a respective cylinder 13.

Moreover, the IC combustion engine 10 is provided with an Exhaust Gas Recirculation (EGR) system. The EGR system comprises an EGR conduit 60 that fluidly connects the exhaust manifold 50 to the intake manifold 20, an EGR valve 61 located in the EGR conduit 60, for regulating the exhaust gas flow therein, and an EGR cooler 62 located in the EGR conduit 60 downstream the EGR valve 61, for reducing the temperature of the exhaust gas before mixing it with the ambient air within the intake manifold 20.

As shown in FIG. 1, the EGR conduit 60 is connected with a pressure tank 70, through a pipe 63 that leads from a point of the EGR conduit 60 downstream the EGR cooler 62, to an inlet 71 of the pressure tank 70. The inlet 71 is provided with a One Way valve 72, which is arranged for allowing the exhaust gas to flow from the EGR conduit 60 into the pressure tank 70, but for preventing the reverse flow.

The pressure tank 70 further comprises a plurality of injection port 73, each of which leads from the pressure tank 70 directly to one intake port 16 of a respective cylinder 13. In particular, each injection port 73 fluidly connects the pressure tank 70 with the intake port 16 that is provided with the swirl valve 33, leading to a point downstream the swirl valve 33 itself. In this way, it is possible to achieve a higher delta pressure between the pressure tank 70 and the intake ports 16, which allows the use of a pressure tank 70 quite small.

As a matter of fact, the volume of the pressure tank 70 can be approximately 1.2 times engine displacement. Nevertheless, it is not excluded that the pressure tank 70 comprises an injection port 73 per each intake port 16. Moreover, it should be appreciated that the swirl devices 30 are neither essential nor intended to limit the scope of the present invention, it being understood that the IC engine 10 could be completely devoid of any swirl device 30. Each injection port 73 is provided with an On-Off control valve 74, for selectively opening or closing the communication between the pressure tank 70 and the respective intake port 16.

As shown in FIG. 1, the On-Off control valves 74 are coupled to a common rotating shaft 75, which is driven by an electromechanical actuator 76, for simultaneously activating the valves 74 in opening or closing configuration. The electromechanical actuator 76 is controlled by the engine control unit (ECU) 40.

The ECU 40 is programmed for implementing a Start and Stop (S&S) functionality, which provides for automatically shutting off the IC engine 10 when the vehicle speed is zero, and for automatically restarting the IC engine 10 when the vehicle is commanded to move, namely in response of the crank-in.

While the IC engine 10 is working, the ECU 40 provides for the On-Off valves 74 to be closed, so that part of the exhaust gas from the EGR conduit 60 passes through the One Way valve 72 and accumulates into the pressure tank 70. The pressure of the exhaust gas stored in the pressure tank 70 is proportional—substantially equal—to the maximum EGR circuit pressure peak. In order to increase the pressure of the stored exhaust gas, the ECU 40 is preferably programmed for regulating one or more engine operating parameters, such as for example engine load, in order to intentionally achieve an exhaust gas production increase during a limited period while the engine is working and the On-Off valves 74 are closed.

During the limited period, the exhaust gas production peak increases the pressure within the EGR system, and therefore the pressure of the exhaust gas stored in the pressure tank 70. The rise of the exhaust gas pressure has the benefit of allowing the reduction of the pressure tank volume, to thereby reducing cost and overall dimension. Preferably, the ECU 40 is programmed for increasing the exhaust gas production during the shutting off phases of the IC engine 10, namely during the last engine cycles before IC engine stop.

The ECU 40 provides for the On-Off valve 74 to remain closed also during the IC engine stop time, in order to keep the exhaust gas stored into the pressure tank 70. During the subsequent start phase of the IC engine 10, namely during the first engine cycles after the IC engine restart, the ECU 40 provides for the On-Off valve 74 to be opened, so that the exhaust gas, previously stored into the pressure tank 70, is supplied into the engine cylinder 13 via the injection ports 73 and the respective intake ports 16, with the aid of the available delta pressure between the pressure tank 70 and the intake ports 16 themselves. In this way, an adequate amount of exhaust gas is effectively fed into the cylinder 13 also during the first engine cycles, while the EGR system is substantially empty, to thereby avoiding the $NO_x$ emission peak at the start phase of IC engine 10.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the forgoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and in their legal equivalents.

What is claimed is:

1. A method for operating an internal combustion engine of a motor vehicle, comprising:
   storing an exhaust gas during operation of the internal combustion engine; and
   supplying the exhaust gas into at least an engine cylinder during a subsequent start phase of the internal combustion engine;
   receiving air via an intake conduit that is fluidly connected to the tank per the engine cylinder via an injection port, wherein the injection port leads into the intake conduit downstream a swirl valve.

2. The method according to claim 1, further comprising regulating an engine operating parameter in order to increase the exhaust gas produced during a storage phase of the exhaust gas.

3. The method according to claim 1, further comprising storing the exhaust gas at least during a shut off phase of the internal combustion engine.

4. An internal combustion engine of a motor vehicle, comprising:
   an engine cylinder;
   an EGR system;
   a tank of the EGR system;
   a valve of the EGR system configured to store exhaust gas into the tank during an operation of the internal combustion engine and configured to supply the exhaust gas from the tank into the engine cylinder during a subsequent start phase of the internal combustion engine;
   an intake conduit that is fluidly connected to the tank per the engine cylinder via an injection port; and
   a swirl valve for the intake conduit, wherein the injection port leads into the intake conduit downstream the swirl valve.

5. The internal combustion engine according to claim 4, wherein the tank is fluidly connected to a plurality of cylinder intake conduits via a plurality of injection ports.

6. The internal combustion engine according to claim 4, wherein the injection port comprises an On/Off electrically controlled valve located in the injection port.

7. The internal combustion engine according to claim 4, wherein the valve comprises a one way valve located in the intake conduit.

8. The internal combustion engine according to claim 4, further comprising a control system configured to regulate an engine operating parameter in order to increase production of the exhaust gas during the operation of the internal combustion engine.

9. The internal combustion engine according to claim 4, further comprising a control system configured to implement an engine start and substantially stop functionality.

* * * * *